(12) United States Patent
Druelle et al.

(10) Patent No.: US 7,368,201 B1
(45) Date of Patent: May 6, 2008

(54) BOX FOR SET OF ELECTRIC STORAGE BATTERIES

(75) Inventors: Claude Maurice Druelle, Beaurains (FR); Pierre Georges Lenain, Arras (FR)

(73) Assignee: Hawker SA, Arras (FR)

( * ) Notice: Subject to any disclaimer, the term of this patent is extended or adjusted under 35 U.S.C. 154(b) by 0 days.

(21) Appl. No.: 09/936,231

(22) PCT Filed: Mar. 10, 2000

(86) PCT No.: PCT/FR00/00598

§ 371 (c)(1),
(2), (4) Date: Sep. 12, 2001

(87) PCT Pub. No.: WO00/54349

PCT Pub. Date: Sep. 14, 2000

(30) Foreign Application Priority Data

Mar. 11, 1999 (FR) .................... 99 03012

(51) Int. Cl.
*H01M 2/10* (2006.01)
(52) U.S. Cl. ........................ 429/99; 180/68.5
(58) Field of Classification Search .......... 429/96–100, 429/175–177; 206/703–705; 224/902; 220/4.01–4.34, 220/6, 475, 500, 507, 512, 520, 531, 535, 220/541–545, 241, 260, 271, 604, 609, 622, 220/617–620
See application file for complete search history.

(56) References Cited

U.S. PATENT DOCUMENTS

| 2,172,266 | A | * | 9/1939 | Whitaker | 312/107 |
| 2,916,161 | A | * | 12/1959 | Schaefer | 211/126.2 |
| 5,056,677 | A | * | 10/1991 | Toyosawa | 220/4.21 |
| 5,140,744 | A | * | 8/1992 | Miller | 29/730 |
| 5,143,215 | A | * | 9/1992 | Hartley et al. | 206/705 |
| 5,304,434 | A | * | 4/1994 | Stone | 429/99 |
| 5,403,679 | A | * | 4/1995 | Stone | 429/99 |
| 5,981,101 | A | * | 11/1999 | Stone | 429/100 |
| 6,400,122 | B1 | * | 6/2002 | Iwamura | 320/107 |

FOREIGN PATENT DOCUMENTS

| EP | 0 405 803 A1 | 1/1991 |
| EP | 0 575 060 A1 | 12/1993 |
| JP | 11025947 A | * 1/1999 |

* cited by examiner

*Primary Examiner*—Mark Ruthkosky
*Assistant Examiner*—Keith Walker
(74) *Attorney, Agent, or Firm*—Young & Thompson

(57) ABSTRACT

A box for a set of electric storage batteries includes at least two side walls extending generally parallel and defining between them a housing for receiving batteries. The side walls consist of an assembly of stacked modules each comprising a pair of wall elements mounted opposite each other.

14 Claims, 1 Drawing Sheet

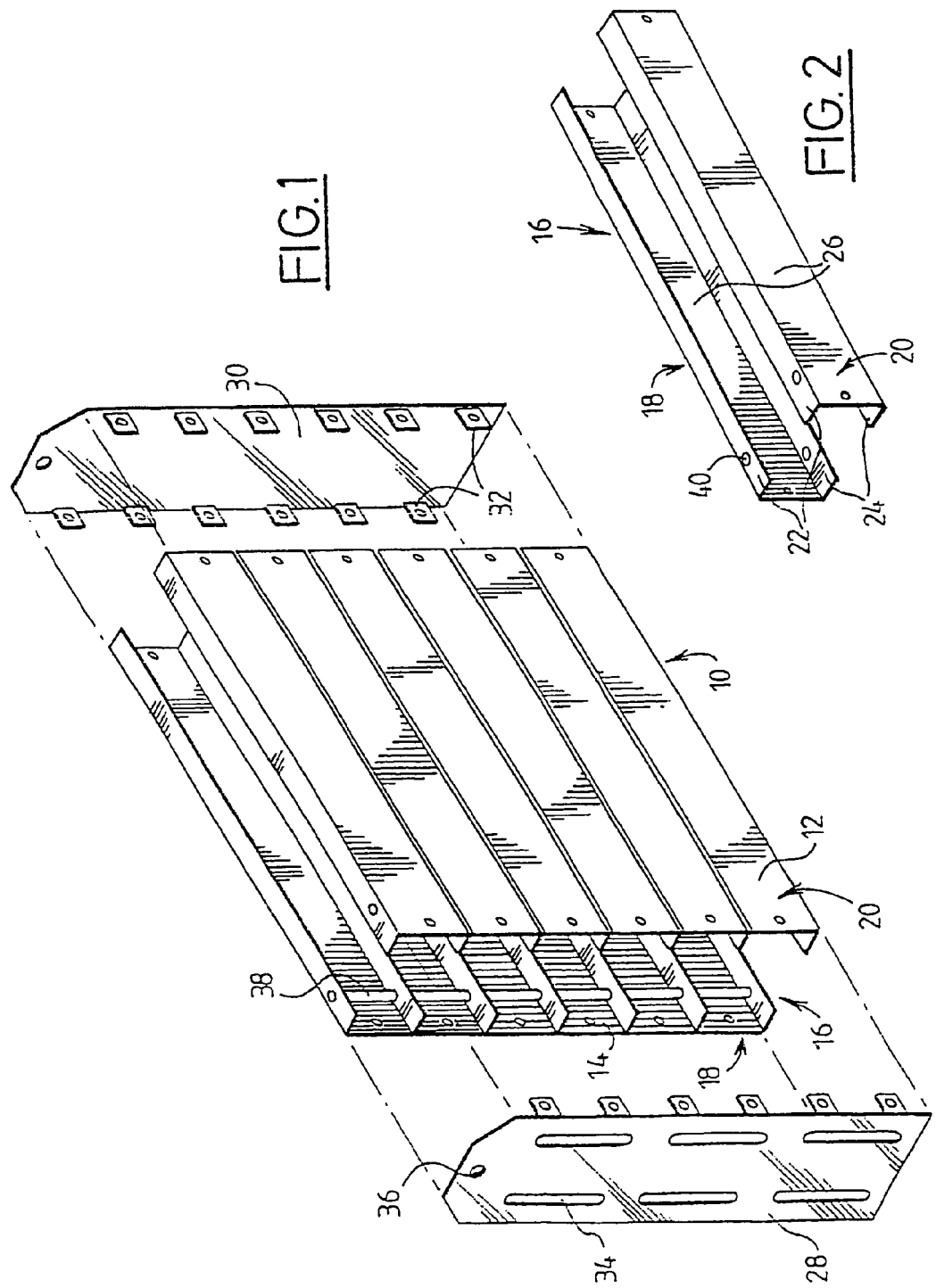

BOX FOR SET OF ELECTRIC STORAGE BATTERIES

BRIEF DESCRIPTION OF THE INVENTION

The present invention relates to a box for a set of electric storage batteries, particularly for an electric self-propelled vehicle, such as a maintenance machine and is particularly suitable for receiving batteries consisting of sealed elements of the gas recombination type.

DESCRIPTION OF THE RELATED ART

As is conventional, the power source used for electric vehicles is an assembly of batteries, each capable of delivering a voltage of the order of, for example, 2 volts. These batteries are placed in series or in parallel in a case placed in a housing provided for this purpose in the vehicle.

As will be appreciated, in order to reduce the number of battery charging and discharging cycles and so increase their life, a large number of batteries must be carried in order for there to be sufficient electric power available.

SUMMARY OF THE INVENTION

The document EP-A 0 575 060 discloses a box for a set of electric storage batteries, in which the side walls consist of an assembly of elementary stacked modules placed independently side by side. The document EP-A-0 405 803 discloses a box for the same use, which has no side walls and does not consist of an assembly of stacked modules, but of a pair of elements mounted opposite each other. These sets are stationary systems, not intended to be carried in an electric vehicle. They do not allow the rapid installation of several batteries at a time on the same pair of wall elements.

The object of the invention is to provide a battery box capable of containing a large number of electric storage batteries within a small space.

Its subject is therefore a box for a set of electric storage batteries comprising at least two side walls extending generally parallel and defining between themselves a housing for receiving the batteries, the box being characterized in that the side walls consist of an assembly of stacked elementary modules each comprising a pair of wall elements mounted opposite each other.

In this way the overall volume of the box is adapted to the number of batteries carried, so that the amount of unoccupied free space is reduced.

The box according to the invention may also comprise one or more of the following characteristics, taken in isolation or in accordance with all technically possible combinations:

- each wall element is in the form of a profile and comprises at least one folded edge that defines, jointly with a folded edge of the wall element mounted opposite it, a support for at least one row of batteries;
- it also comprises battery retention means;
- the retention means comprise a removable rod extending through the folded edges of the stacked wall elements;
- it also comprises two end plates, each provided with fixing lugs for the wall elements;
- the end plates are provided with openings for the ventilation of the battery elements;
- the end plates are each provided with a handling point for engagement by a lifting appliance.

The invention also relates to a system of boxes for a set of electric storage batteries characterized in that it consists of a set of boxes as defined above.

BRIEF DESCRIPTION OF THE DRAWINGS

Other characteristics and advantages will become clear in the course of the description, which is given purely by way of example and with reference to the accompanying drawings, in which:

FIG. 1 is an exploded perspective view of a box in accordance with the invention; and FIG. 2 is a perspective view of a module used in the construction of the box shown in FIG. 1.

DESCRIPTION OF THE PREFERRED EMBODIMENTS

FIG. 1 shows a battery box for an electric self-propelled vehicle, denoted by the general reference number 10 and positioned in what would be assumed to be a vertical position.

It is intended to receive a set of electric storage batteries, particularly sealed elements of the gas-recombination type, and to be placed in a housing provided for this purpose in a vehicle so as to serve as a source of electric motive power.

The box 10 comprises two side walls 12 and 14 spaced apart and defining between themselves a housing in which the batteries are placed. For example, each battery is capable of delivering a voltage of the order of 2 volts.

With reference also to FIG. 2, the side walls 12 and 14 are made up of an assembly of elementary interchangeable stacked modules, such as 16. The number of modules used depends on the number of batteries to be carried.

Each module 16 comprises a pair of wall elements 18 and 20 arranged opposite each other in the assembled condition.

Each wall element is in the form of a U section whose arms 22 and 24 point inwards into the housing and permit stacking of the wall elements on top of each other while its base 26 is designed to form after assembly, and jointly with the other wall elements of the stack, the side wall proper of the box 10.

More specifically, in the assembled condition, the lower arms 24 of the opposing wall elements 18 and 20 together form a support designed to receive one or more rows of electric storage batteries, these batteries being connected in series or in parallel.

Referring once again to FIG. 1, the box 10 also includes two end plates 28 and 30 attached to the free ends of the case composed of the assembled modules 16. At least one end plate is attached removably for the batteries to be placed in or removed from the box 10.

More specifically, each end plate 28 and 30 is provided with fixing lugs, such as 32, arranged in pairs with one elementary module 16 attached to each lug.

It will be seen that the dimensions of the end plates 28 and 30 are such as to space the wall elements 18 and 20 of each module 16 in such a way that the ends of the edges 24 are spaced apart by a distance shorter than the length or width of the batteries.

The end plates 28 and 30 are also provided with openings such as 34, to allow ventilation of the batteries placed in the box 10, and with a handling point 36 designed to engage with a lifting appliance for raising the composite battery and setting it down.

Lastly, FIG. 1 shows that the box 10 is completed by means of retention of the battery elements, in the form of a rod 38 inserted into orifices 40 (FIG. 2) formed in the folded edges 22 and 24 of the wall elements.

Other kinds of appropriate means of retention can of course be envisaged.

In the description of the invention, it has been assumed that the wall elements are in the form of U sections.

It would however be possible, as a variant, to equip the box with modules having wall elements shaped differently e.g. in I sections, particularly in order to make a system of boxes by linking different boxes together.

It will be realized that the battery box according to the invention, as described above, which uses a set of interchangeable modules, enables the total volume to be adapted to the number of batteries it contains and therefore enables its volume to be reduced in the sense that the amount of unoccupied space can in this way be limited.

Should it be wished to increase the number of batteries carried, either longer modules should be used and the same end plates retained, or the number of stacked modules should be increased, and the box provided with higher end plates as a consequence.

If it is wished to provide a power source of very large capacity, it is possible to produce a system of boxes formed of an assembly of several boxes built as described earlier, in which the batteries are connected in series or parallel. In this arrangement, one or more modules may be common to all the boxes.

Furthermore, the edges of the wall elements allow a space to be defined between the racks of batteries which, in conjunction with the openings formed in the side plates, allows for cooling of the battery elements by ventilation.

It will be noted too that the invention greatly facilitates the operations of assembling and disassembling the batteries, in that all that is required is simply to take off one of the side plates and if necessary to remove the retention rod to enable battery elements to be inserted or removed.

Finally, it will be noted that the invention described above greatly facilitates the operations of battery maintenance, as the ventilation openings allow access to the battery elements. It is thus possible to measure the voltage available at the terminals of the battery elements without having to dismantle the box.

The invention claimed is:

1. Box for a set of electric storage batteries, consisting essentially of:
    two side walls (12, 14) extending parallel and defining between themselves a housing for receiving plural batteries on each of a plurality of horizontal levels;
    the side walls (12, 14) consisting of an assembly of vertically stacked modules (16), each module comprising a pair of wall elements (18, 20) mounted opposite each other, wherein,
    each of the pair of wall elements (18, 20) are two horizontally opposed wall elements (18, 20) together forming a floor support for the batteries stored therebetween,
    each of the two horizontally opposed wall elements form at least part of the floor support for one edge of each battery stored therebetween,
    the two horizontally opposed wall elements are separated from each other by an intervening air space so that the two horizontally opposed wall elements support each battery by opposite base edges of the battery with a base area of the battery between the opposite edges unsupported and exposed to the intervening air space,
    each wall element (18, 20) is in the form of a U section with folded edges that define parallel arms (22, 24) pointing inwards into the box toward corresponding coplanar arms of another wall element, the arms of each wall element being spaced apart, by the intervening air space, from the coplanar arms of the another wall element,
    the U sections are directly stacked on another U section, and
    the lower arm of the each U section and the lower arm of the another U section together form one of the horizontal levels of the floor support for the batteries,
    the upper arm of the U section of each wall element abuts the lower arm of the U section of a vertically adjacent wall element and provides a resulting horizontal level of the floor supports having a thickness defined by the abutting upper arm and lower arm, and
    each floor support is sized and constructed to support batteries that are electric self-propelled vehicle batteries having gas recombination sealed elements and sized for serving as a source of electric motive power for a vehicle; and
    two end plates (28, 30) secured to respective ends of the two side walls, at least one of the two end plates being attached removably to allow for the batteries to be horizontally placed in or removed from each horizontal level, the two side walls being connected to each other only by said end plates,
    each end plate provided with vertically spaced apart fixing lugs (32) secured to the wall elements (18, 20), each end plate including a different fixing lug for each wall element (18, 20) such that each of the two end plates is secured, via a different one of the fixing lugs, to one end of every wall element (18, 20).

2. Box according to claim 1, characterized in that it also comprises battery retention means (38).

3. Box according to claim 2, characterized in that the retention means comprise a removable rod (38) extending through the folded edges (22, 24) of the stacked wall elements.

4. Box according to claim 1, characterized in that the end plates are provided with openings (34) for the ventilation of the battery elements.

5. Box according to claim 1, characterized in that the end plates are each provided with a handling point (36) for engagement by a lifting appliance.

6. System of boxes for a set of electric storage batteries, characterized in that it consists of an assembly of boxes (10) according to claim 1.

7. The box of claim 1, wherein, the electric self-propelled vehicle batteries deliver a voltage of the order of 2 volts.

8. The box of claim 1, wherein, the electric self-propelled vehicle batteries are for a maintenance machine vehicle.

9. The box of claim 1, further comprising:
    the electric self-propelled vehicle batteries having gas recombination sealed elements, the batteries sized for serving as a source of electric motive power for the vehicle,
    each floor support supporting plural of the electric self-propelled vehicle batteries stored therebetween.

10. A box for receiving a set of electric storage batteries providing a power source for an electric self-propelled vehicle including a maintenance machine, the batteries having gas recombination sealed elements, comprising:
    two side walls (12, 14) spaced apart by an intervening air space and extending generally parallel and defining between the two side walls a housing in which the batteries are placed, the side walls comprising an assembly of interchangeable vertically stacked elementary modules (16), each elementary module comprising a pair of wall elements (18, 20) mounted opposite each other in an assembled condition and arranged to provide an overall volume of the box adapted to a number of batteries carried on respective ones of plural horizontal levels and reduce an amount of unoccupied free space, the wall elements are in the form of U sections directly stacked one on another, upper arms of the opposing wall elements contact the lower arms of a vertically adjacent wall element, lower arms (24) of the opposing wall elements (18, 20) together forming at least part of a support designed to receive a row of the batteries on one of the horizontal levels, upper arms of the opposing wall elements contacting the lower arms of a vertically adjacent wall element and thereby providing that at least some of the horizontal levels with a battery support comprised the contacting lower and upper arms, wherein, edges of the lower arms of each wall element are separated from each other by the intervening air space so that the edges of the lower arms support each battery by opposite base edges of the battery with a base area of the battery between the opposite edges unsupported and exposed to the intervening air space, each side wall being free of contact with the other side wall, and the edges of each of the lowers arms are constructed to support a set of the electric storage batteries that provide the power source for electric self-propelled vehicles including maintenance machines, the batteries having gas recombination sealed elements;

two end plates (28, 30) attached to free ends of the side walls (12, 14), one of the two end plates being attached removably to the corresponding free end to allow for the batteries to be horizontally placed in or removed from each elementary module at the corresponding free end; and fixing lugs (32) extending from each end plate, the fixing lugs being vertically spaced apart and arranged in pairs with each free end of each elementary module (16) attached to a corresponding different one of the lugs.

11. The box of claim 10, wherein, dimensions of the end plates (28, 30) space the wall elements (18, 20) of each elementary module (16) in such a way that the ends of edges (24) of the wall elements (18, 20) are spaced apart by a distance shorter than the length or width of the batteries.

12. The box of claim 10, further comprising:

ventilation openings (34) in the end plates (28, 30) to allow ventilation of the batteries placed in the box; and a handling point (36) in an upper part of each end plate designed to engage with a lifting appliance for raising and lowering the box when carrying the batteries.

13. The box of claim 10, further comprising:

a battery retaining element located in each side wall (12, 14) and extending through each wall element (18, 20) of a respective side wall (12, 14), the battery retaining element configured to retain the batteries in a respective elementary module (16).

14. The box of claim 13, wherein, the battery retaining element is a rod (38) inserted into orifices (40) formed in folded edges (22, 24) of the wall elements.

* * * * *